(12) United States Patent
Shukla et al.

(10) Patent No.: US 12,404,214 B2
(45) Date of Patent: Sep. 2, 2025

(54) COMPOSITION FOR MANUFACTURING PLASTIC COMPOSITES AND A PROCESS THEREOF

(71) Applicant: SALTECH DESIGN LABS PRIVATE LIMITED, Khambhat (IN)

(72) Inventors: Aditya Suraj Shukla, Khambhat (IN); Sudhirkumar Chandramani Shukla, Khambhat (IN); Yogesh kumar Rameshvar Sharma, Sabarkantha Ider (IN)

(73) Assignee: SALTECH DESIGN LABS PRIVATE LIMITED, Khambhat (IN)

( * ) Notice: Subject to any disclaimer, the term of this patent is extended or adjusted under 35 U.S.C. 154(b) by 508 days.

(21) Appl. No.: 17/284,235

(22) PCT Filed: Oct. 7, 2019

(86) PCT No.: PCT/IN2019/050744
§ 371 (c)(1),
(2) Date: Apr. 9, 2021

(87) PCT Pub. No.: WO2020/075188
PCT Pub. Date: Apr. 16, 2020

(65) Prior Publication Data
US 2021/0331975 A1    Oct. 28, 2021

(30) Foreign Application Priority Data
Oct. 9, 2018  (IN) .............................. 201821038244

(51) Int. Cl.
| C04B 26/00 | (2006.01) |
| B29B 17/00 | (2006.01) |
| B29B 17/04 | (2006.01) |
| B29C 67/24 | (2006.01) |
| C04B 14/06 | (2006.01) |
| C04B 18/08 | (2006.01) |
| C04B 18/12 | (2006.01) |
| C04B 18/16 | (2023.01) |
| C04B 18/165 | (2023.01) |
| B29K 103/08 | (2006.01) |
| B29K 105/26 | (2006.01) |
| C04B 111/28 | (2006.01) |

(52) U.S. Cl.
CPC ........ *C04B 26/006* (2013.01); *B29B 17/0026* (2013.01); *B29B 17/0412* (2013.01); *B29C 67/243* (2013.01); *C04B 14/06* (2013.01); *C04B 18/08* (2013.01); *C04B 18/12* (2013.01); *C04B 18/165* (2013.01); *B29B 2017/0015* (2013.01); *B29B 2017/042* (2013.01); *B29B 2017/0476* (2013.01); *B29K 2103/08* (2013.01); *B29K 2105/26* (2013.01); *C04B 2111/28* (2013.01); *C04B 2201/50* (2013.01)

(58) Field of Classification Search
CPC ............ B29B 17/0026; B29B 17/0412; B29B 2017/0015; B29B 2017/042; B29B 2017/0476; B29C 67/243; B29K 2103/08; B29K 2105/26; C04B 14/06; C04B 18/08; C04B 18/12; C04B 18/165; C04B 20/0076; C04B 2111/28; C04B 2201/50; C04B 26/006; C04B 40/0082; C08J 11/04; Y02W 30/52; Y02W 30/62; Y02W 30/91
See application file for complete search history.

(56) References Cited

U.S. PATENT DOCUMENTS

| 2002/0050233 A1 | 5/2002 | Balkum ........................ 106/803 |
| 2012/0119414 A1* | 5/2012 | Van Helden ............ C04B 26/18 |
| | | 264/239 |

FOREIGN PATENT DOCUMENTS

| AU | 2020102838 A4 | 10/2020 |
| CN | 1810701 A | 8/2006 |
| CN | 100415671 C * | 9/2008 |
| CN | 101381211 A | 3/2009 |
| CN | 101386499 A | 3/2009 |
| CN | 101698312 A | 4/2010 |
| CN | 102875181 A | 1/2013 |
| CN | 111718172 A | 9/2020 |
| JP | H 06-321601 A | 11/1994 |
| JP | 2001-048631 A | 2/2001 |

OTHER PUBLICATIONS

Indian Patent Certificate dated Oct. 9, 2018, issued by the Intellectual Property Office of India in corresponding application IN 201821038244.
Chinese Office Action dated Nov. 21, 2022, issued by the China National Intellectual Property Administration in corresponding application CN 201980065606.4.

* cited by examiner

*Primary Examiner* — Shuangyi Abu Ali
(74) *Attorney, Agent, or Firm* — Kevin J Fournier; Kevin J Fournier Intellectual Property Legal Services Ltd.

(57) ABSTRACT

The present invention provides particular a novel composition for manufacturing plastic composites and a process thereof. Said invention provides a composition and a process utilizes any or all kind of plastic waste in manufacturing composites and thereby is economical and environment friendly. It utilizes any or all kind of plastic wastes includes road waste, soft & hard form of plastic waste. Moreover, it eliminates the use of cement and utilizes plastic wastes in manufacturing composites; therefore is environment friendly. Said present compositions utilizes plastic waste in manufacturing light weight composites that are highly stable with increased strength, shelf life and durability. Said composition is fire resistant with increased strength withstanding heavy load.

6 Claims, No Drawings

COMPOSITION FOR MANUFACTURING PLASTIC COMPOSITES AND A PROCESS THEREOF

CROSS-REFERENCE TO RELATED APPLICATIONS

This application is a national stage of International Application No. PCT/IN2019/050744, filed Oct. 7, 2019, which claims the benefit of Indian Application No. 201821038244, filed Oct. 9, 2018, in the Indian Patent Office, the disclosures of which are incorporated herein by reference.

FIELD OF INVENTION

The present invention provides a novel composition for manufacturing plastic composites and a process thereof. In particular present invention provides a composition and a process that eliminates the use of cement and utilizes plastic wastes in manufacturing composites; therefore is environment friendly.

BACKGROUND OF INVENTION

Environment pollution and judicious use of resources available to mankind is need of the hour. Cement as a building material is second largest material which is currently used after water. Architectural and construction applications such as roads, bridges, commercials, residential buildings, water pipelines and alike require a significant amount of cement based concrete.

Composites are a special solid and unreinforced precast piece of concrete commonly used in pavement applications. Composites are the most preferred choice for paving of footpaths, parking plots, bus stops, and industries. The conventional composites are made up from cement.

However there are many disadvantages associated with the use of cement in the building material along with polluting the environment. The Portland cement are high in cost and susceptible under acid rain, stress and/or road salts. Further the concrete made up from the Portland cement takes time to harden. The setting of the cement is a long process and it is alkaline in nature, which may lead to lung and skin disorders because of the excessive heat released during setting and curing. In furtherance Carbon emissions, water pollution, and release of heavy metals in the air are common problems associated with manufacturing of ordinary Portland cement. Moreover cement dust is a major pollutant and irritant that not only affects the health of the people, but also poses threat to plants. Also traces of dust are often seen on fixtures, structures, and plants surrounding a cement factory that certainly affects the health of people nearby.

Plastics are yet another factor that poses danger to the sustainability of environment. They are not biodegradable and hence generates large quantities of landfills that pollutes the environment. Plastic packaging—especially the ubiquitous plastic bag—is a significant source of landfill waste and is regularly eaten by numerous marine and land animals, to fatal consequences. Synthetic plastic does not biodegrade. Moreover the production of plastic requires large amount of crude oil that in turn leads to the decrease in the natural crude oil resources. In furtherance to this the process for manufacturing plastics requires large amount of energy input. Considering the disadvantages of the plastics and the threats associated with the plastic pollution conventional techniques provides composites made from recycled plastics.

Industrial waste like fly ash, quarry dust, foundry sand, ceramic waste has no after life use therefore are usually dumped into landfills. Polluter even pay to dump these industrial waste due to Solid Waste Management revised rule in 2016 by Government of India. These waste are considered as hazardous for air and water pollution as their particulates which are light in weight generally flows in wind and miscibility with liquids pollutes water. Construction & Demolition waste increasing as rapid infrastructure is growing. New infrastructure replaces old but leaves construction & demolition waste behind. No option to utilize recycled aggregates from construction & demolition waste into new concrete in heavy application due to decrease in engineering properties such as slump and compressive strength.

Conventional processes using recycled materials/plastics/industrial wastes are however not efficient as the process requires sorting and segregating different kind of plastics which in turn again employs the tedious and energy consuming process that ultimately is not energy efficient and is time consuming. Also the said processes requires larger machinery for its operation which is not economical and user friendly. Further the process of recycling the plastic and melting it down generates volatile organic compounds, fumes that are hazardous to plant and animal life. Moreover the plastic waste is not completely recycled and is dumped in the dumping yards that ultimately results into plastic polluted landfills. These plastic dump yards prevents the organic waste from being degraded and poses threat to the environment.

Prior Art and its Disadvantages

US patent application Ser. No. 08/555,527 relates to an asphaltic concrete or paving material includes at least 5 percent, and preferably from 5 to 20 percent, of granular recycled plastic, which supplements or replaces the rock aggregate component of the mixture. The material produces a structurally superior paving material and longer lived roadbed. The plastic may include any and all residual classes of recyclable plastic, including thermosetting plastics and other plastics having little to no current widespread utility. The material produces roadbeds of higher strength with less total asphalt thickness and having greater water impermeability, and is most useful for all layers below the surface layer. The recyclable plastic component of the material is preferably a mixture of all recyclable classes 3 through 7, or of those materials from such classes from which potentially more valuable recyclable materials have been selectively removed. The paving product is preferably formed by a process of shredding or mechanically granulating used and industrial waste plastic to a no. 4 to ½ inch sieve size, and preferably to ¼ inch to ⅜ inch granules. The granules are then treated with an energized activating medium such as a plasma or a reducing flame, to activate the surface of the granules, preferably without burning or melting the plastic. The activated treated granules are then added to the aggregate and mixed with the asphalt binder to produce the paving material. A slurry or sand mix of plastic and binder may also be applied over an aggregate layer, base layer or roadbed.

However, said above patent application granular recycled plastic which requires the process for segregation of the raw material. Wherein the present invention eliminates the need of segregating the plastic waste and thereby eliminates the requirement of heavy machinery required for segregation plastic wastes, and thereby use less time, energy and cost. Said above prior art fails to manufacturing of plastic composites that utilizes any or all kind of plastic wastes and also include fly ash, quarry dust, ceramic waste, foundry sand, construction and demolition waste which substantially increased shelf life, strength, substantially high strength to weight ratio and durability. Therefore, above patent application fails to provide novel composition for manufacturing plastic composites and the process thereof.

Indian Patent Application No. 198254 relates to a new mix process of waste plastic-aggregate bitumen for flexible pavement. Waste plastics have binding property in their molten state. Using this property, waste plastics, aggregate and bitumen mix having waste plastics upto 2 parts by weight, bitumen 3-6 parts by weight and the aggregate 92 to 95 parts by weight. The mix is then used for flexible road construction. A process of manufacturing the above said waste plastics-aggregates-bitumen mix (composite) comprises the following steps. a) Sorting and cleaning of waste plastics to identify polyethylene, polypropylene and polystyrene and to reject polyvinyl chloride. b) Shredding the film to a size, which passes through 6.75 mm sieve and retains in 2.36 mm sieve c) Heating the aggregate to 155-165 deg. C. d) Heating the bitumen separately to 160 deg. C. (should not be heated more) e) Adding the plastics pieces over hot aggregate, having chosen composition and mix it through puddler for uniform coating. f) Add the hot bitumen (160 deg. C.) over the plastics coated aggregate and mix it uniformly. g) Waste polymer-aggregate-bitumen mix is now taken for road laying. A method of manufacturing the mix (composite) of waste plastics-aggregate-bitumen as described in the complete specification is our invention.

However, the drawbacks associated with this prior art are the method of manufacturing the mix (composite) of waste plastics-aggregate-bitumen. Wherein the present invention provides novel composition for manufacturing plastic composites and its process which utilizes any or all kind of plastic wastes and also include fly ash, quarry dust, ceramic waste, foundry sand, construction and demolition waste which substantially increased shelf life, strength, substantially high strength to weight ratio and durability. Said above prior art requires the process for segregation of the raw material, wherein the present invention eliminates the need of segregating the plastic waste and thereby eliminates the requirement of heavy machinery required for segregation plastic wastes, and thus use less time, energy and cost.

Another patent application no WO1989006259 A1 discloses a bitumen substitute synthetic plastics material binder is disclosed which includes at least one natural resin, a mixture of two or more synthetic plastics materials and suitable lubricants or thickeners. The binder can be suitably colored or compounded with aggregates and/or mineral fillers to form a synthetic paving or sealing material. The binder can include recycled plastics material and the binder itself and the paving or sealing materials can be recycled.

However, the cited prior art do not provide a composition to manufacture the plastic composites and also do not provide the process for manufacturing the same. Further the prior art requires use of 30 gum/resin in binding, lubricating agent which is an oil and comprises of petroleum oil, flux oil and paraffin oil & thickening agent such as hydroxymethyl-cellulose, hydroxyethyl-cellulose, lithium & silicon grease to obtain synthetic binder composition to replace bituminous binder. This incurs additional costs and involves the use of additional raw materials and therefore is not efficient and cost effective and is also not environment friendly.

Reference may be made to U.S. Pat. No. 5,741,454 which describes a method of making composite tiles containing waste plastic. The invention relates to taking plastic materials composed of the waste of some industrial processes (for example in the shoe-making sector), and/or coming from plastic objects of current use being put out of use. These wastes are frequently crushed to be used again in subsequent transformations. The invention solves the problem of making, by means of a suitable manufacturing process, a composite tile in which plastic material of a suitable quality for the environment in which the tile will be used is injected into a mould so as to form an outer shell of the tile, inside which, at a later stage, waste plastic material is injected with the function of filling the tile.

However, the drawbacks associated with this prior art are the use of waste of shoe making sector for making these products, whereas the present process is entirely based on waste plastic bags and plastics based on HDPE, LDPE, PET, PS and PP and our process involves use of fillers like fly ash, quarry dust, ceramic waste, foundry sand and Construction & demolition waste which not only increases substantially increased shelf life, strength, substantially high strength to weight ratio and durability. Moreover, said above prior art requires the process for segregation of the raw material, wherein the present invention eliminates the need of segregating the plastic waste and thereby eliminates the requirement of heavy machinery required for segregation plastic wastes, and thus use less time, energy and cost.

Disadvantages of Prior Art

Said prior art suffers from at least all or any of the following disadvantages:

- They do not provide a composition for manufacturing plastic composites.
- Most of them fails to eliminate the use of cement in manufacturing composites, and thereby are not environment friendly
- Most of the conventional processes to manufacture plastic composites requires segregation of the waste plastics used as raw materials which in turn involves huge machinery, more time and man power. Therefore are not efficient, environment friendly and are also not economical.
- Most of them fails to utilize any or all kind of the plastic wastes without segregation and hence are not efficient in providing a stable composition to manufacture plastic paver blocks involving substantially less time, man power and cost.
- They do not provide a process that eliminates the carbon emission during plastic waste recycling and hence are not environment friendly.
- Most of the conventional process generates a large amount of effluent during the process of manufacturing plastic composites and hence are not environment friendly.
- They fail to provide light in weight yet substantially stable plastic composites.
- Many of the conventional process provides high water absorption rate that leads to use of large amount of water in the process.
- The existing process fails to provide resistance to physical and chemical forces, chemical resistance, corrosion resistance and shock resistance.

They fail to provide stable plastic composites that are resistant to flammability and burning.

They do not provide reusable plastic composites.

They are costly and are not user friendly.

Thus, there is an unmet urge to provide the invention that obviates the disadvantages of prior art and provides a solution to the problems yet unaddressed.

OBJECTS OF INVENTION

The primary object of the present invention is to provide a novel composition for manufacturing plastic composites and the process thereof.

Further object of the present invention is to provide a novel composition for manufacturing of plastic composites that eliminates the use of cement.

Further object of the present invention is to provide a novel composition for manufacturing of plastic composites that utilizes any or all kind of plastic wastes.

Further object of the present invention is to provide a novel composition for manufacturing of plastic composites that eliminates the need of segregating the plastic waste while manufacturing plastic composites and thereby eliminates the need of heavy machinery required by the conventional processes to segregate plastic wastes. Thus, reduces the time taken, cost incurred in installation and maintenance of heavy machinery; yet is efficient.

Further object of the present invention is to provide a novel composition for manufacturing of plastic composites and process that provides light weight yet substantially stable composite with increased strength.

Further object of the present invention is to provide a composition that is resistant to fire, and withstand heavy load.

Further object of the present invention is to provide a composition to manufacture plastic composite and a process that provides substantially increased shelf life and durability to the composite.

Further object of the present invention is to provide a novel composition for manufacturing plastic composite and process that is varied according to the requirement of strength, durability, thickness and usage.

Further object of the present invention is to provide a novel composition for manufacturing plastic composites and a process, wherein the process facilitates recycling of the plastic waste without segregating it and generating effluent and hence is environment friendly.

Further object of the present invention is to provide a novel composition for manufacturing plastic composite and process wherein the process eliminates generation of any hazardous gases during manufacturing.

Further object of the present invention is to provide a novel composition for manufacturing plastic composite and process wherein the process eliminates the carbon emission during plastic waste recycling Further object of the present invention is to provide a novel composition for manufacturing plastic composite and process wherein the process use less water absorption rate.

Further object of the present invention is to provide a novel composition for manufacturing plastic composite and process that is resistance to physical and chemical forces, corrosion resistance, chemical resistance and shock resistance.

Further object of the present invention is to provide a novel composition for manufacturing plastic composite and process that obviates the problem of prior art.

DETAILED DESCRIPTION OF INVENTION

An embodiment of the present invention provides a novel composition for manufacturing the plastic composites and a process thereof. Said invention utilizes any or all kind of plastic waste in manufacturing composites and thereby is economical and environment friendly. Wherein any or all kind of plastic wastes includes road waste, soft & hard form of plastic waste. The present invention utilizes plastic waste in manufacturing light weight composites that are highly stable with increased strength, shelf life and durability. Said composition is fire resistant with increased strength withstanding heavy load. The present process for manufacturing said lightweight yet strengthened and durable composites from plastic wastes eliminates the process of segregating the plastic waste raw material in turn eliminating the need of heavy machinery required by the conventional processes to segregate plastic wastes. Present process is less time consuming and is energy as well as cost efficient. Also, said process eliminates the generation of effluent and carbon emission being environment friendly.

The present invention utilizes any or all kind of plastic & industrial wastes as raw materials to manufacture composites.

Wherein

Said novel composition for manufacturing the composites, comprises of:

Composite A

Composite B

Composite C

Said composite A, composite B and composite C is in the ratio of 0-90%:10-70%:0-80% respectively.

Wherein;

Said composite A consists of sand or silica and aggregates or quarry dust wherein said sand or silica comprises of but does not limits to the use of fine grain, sand waste and foundry sand. Said sand or silica is in the range of 40 to 100%. The particle size of said sand or silica is in the range of 2 mm to 15 mm. Said aggregates or quarry dust is in the range of 0 to 60%. The particle size of said aggregates or quarry dust is in range of 1 mm to 25 mm.

Said composite B consist of plastic wastes and copolymers. The present invention eliminates the need of segregating the plastic wastes and thereby utilizing any or all kind of plastic waste raw material in the same form in which it is received. Wherein the plastic waste used in the present composition is the plastic waste that utilizes varied plastics not limiting to the use of PET (Polyethyleneterephthalate), HDPE (High density polyethylene), LDPE (Low density polyethylene), PP (polypropelyne), polystyrene, Water bottles, Bags, Jars, Drums, poly sack, Toys, PVC cooling sheets, HM bags, bottles, Industrial, plastic bags, Articles, Films, Articles (cup), MLP (Multi-layer plastic) laminated, Aluminium content plastic, Soft plastics and mixture of them. The plastic waste in the present composition is therefore non segregated plastic waste saving the time, energy and cost of the entire process. Said plastic waste is in the range of 85-100%. Said copolymers utilizes varied polymers not limiting to the use of ethylene and propylene. Said copolymers is in the range of 0-15%.

Said composite C consist of fly ash, ceramic waste and additives. Said fly ash is in the range of 20 to 100%. Said ceramic waste consists of but does not limiting to the use of ceramic waste; wherein said ceramic waste is in the range of 0 to 80%. Said additives consists of but does not limiting to the use of Aluminum hydroxide, polyester, PVC, Huntite (Mg3Ca(Co3)$_4$), magnesium hydroxide, ethyl-vinyl acetate $((C_2H_4)\underline{n}(C_4H_6O_2)\underline{n})$ and combination of thereof. Said additives in the range of 0 to 15%.

Another embodiment of the present invention provides a novel composition to manufacture plastic composites that varies in accordance with its strength, durability, thickness and usage. Wherein in order to withstand the heavy load the strength of the manufactured composite is in the range of 50 $N/mm^2$ to 75 $N/mm^2$; whereas the thickness of the composite varies in the range 0f 45 mm to 60 mm. Said composite withstanding the heavy load comprises of:

Composite A
Composite B
Composite C

Said composite A, composite B and composite C is in the ratio of 40-65%:57-30%:3.5-5% respectively.

Yet further embodiment of the present invention provides the composition to withstand the light load. Wherein in order to withstand the light load the strength of the manufactured composite is in the range of 25 $N/mm^2$-31 $N/mm^2$; whereas the thickness of the composite varies in the range of 20 mm to 30 mm. Said composite withstanding the light load comprises of:

Composite A
Composite B
Composite C

Said composite A, composite B and composite C is in the ratio of 70-54%:28-40%:2-3%.

The process for manufacturing the novel plastic composites eliminating the effluent generation, hazardous chemicals generation and carbon emission involves the steps described herein below:

Step. 1: Collecting of Composites:

Collecting of said composites A, B and C, which includes sand or silica, aggregates or quarry dust, plastic wastes, copolymer, fly ash, ceramic waste and various additives.

Step 2: Cleaning and De Moisturizing Composite A:

Cleaning of composite a utilizing sand mesh wire and employing the sand granules of size ranging from 1 to 5 mm for use in the present composition. Followed by de moisturizing the cleaned sand by heating in upto 100° C. removing the moisture content. Mixing of fly ash of Composite C in the dried sand.

Step 3: Shredding, Washing and Drying Composite B:

Shredding of said composite B into the flakes ranging from 5 to 15 mm utilizing shredder machine. Said flakes are washed in order to remove impurities and other contaminants and are dried. Mixing of said plastic flakes and co polymers in a mixer.

Step 4: Preparing Mixture and Mixing all the Composites.

Mixing and blending of composite A, B and C within said ratio into the blender

Step. 5: Feeding the Mixture to Customized Heater

The mixture obtained in step 4 is feed and processed into the customized heater with temperature ranging 160°-300° centigrade keeping it in continuous drive at 10-30 RPM mixture which prepares and homogenize the material. Said mixture prepare the bonding between particles or resins which provide semi solid material.

Step 6: Moulding of Said Processed Mixture and Extracting Composites

The semi-solid mixture obtained from step 5 is subjected into the die casting mould extracting the composite applying hydraulic pressure.

Step. 7: Ambient Curing of Composites

Extracted composites are subjected to ambient curing for a period less than 1 hour. The step enables the present invention to cure the processed composite at ambient temperature eliminating the need of the employing the temperature to cure the composite, thus being energy efficient and environment friendly. Also the time required to cure the processed composite is substantially less as the range of various compositions in the said composites absorbs less water.

Present novel composition for manufacturing plastic composites and the process thereof is further utilized to manufacture varied plastic composites not limiting to, paving blocks, tiles, roof tiles and others by varying the composition in the given range. The composites manufactured by the present composition in the said specified range by the aforesaid process are resistance to freeze/thaw damage, shock, chemical damage, and thermal damage. It provides the composite with substantially increased shelf life, strength, substantially high strength to weight ratio and durability. Also the composite provided are resistant to external physical and chemical forces, ultraviolet radiation. Moreover the composites manufactured by the present composition and process are fire resistant, absorbs less water, are abrasive resistant, corrosion resistant. Said process for manufacturing composites eliminates the generation of effluent, hazardous gases and carbon emission which helps in pollution control at time of production and is therefore is highly efficient and environment friendly.

EXAMPLE

Said composite A, B and C are taken in said ratio with High strength, Medium strength and Low strength of the same. Said ratio indicates the compressive strength of material, water absorption, impact strength and flammability at different composition. Said below table illustrate and results in high compressive strength, minimum water absorption, pass the impact strength and provide resistance to fire as shown in below table:

|  | Composites | Ratio % | Compressive strength | Water absorption | Impact strength | Flammability |
|---|---|---|---|---|---|---|
| High strength | Composite A | 57-30 | 50-75 $N/mm^2$ | 0.2% | Pass | Non-flammable |
|  | Composite B | 40-65 |  |  |  |  |
|  | Composite C | 3.5-5 |  |  |  |  |
| Medium strength | Composite A | 70-54 | 33-45 $N/mm^2$ | 0.2% | Pass | Non-flammable) |
|  | Composite B | 28-40 |  |  |  |  |
|  | Composite C | 2-3 |  |  |  |  |
| Low strength | Composite A | 20-27 | 25-31 $N/mm^2$ | 0.25% | Pass | Non-flammable |
|  | Composite B | 80-70 |  |  |  |  |
|  | Composite C | 0-2 |  |  |  |  |

Therefore from above table, the present invention (P) provide composites manufactured by the present composition in the said specified range by the aforesaid process are resistance to freeze/thaw damage, shock, chemical damage, and thermal damage. It provides the composite with substantially increased shelf life, strength, substantially high strength to weight ratio and durability and therefore is highly efficient and environment friendly.

Comparison of Prior Art and Present Invention

The typical prior art and the present invention are hereby compared in the below table to clearly bring out the technical differences between the prior art and the present invention.

A comparison is done between the prior art and of the present invention through the values of various parameters and its impact. This clearly depicts the disadvantages of the prior arts systems; thereby establishing the need for the present invention.

| Description | Prior Art | Present composition |
| --- | --- | --- |
| Size | 200 × 165 × 60 | 200 × 165 × 20 |
| Weight | 3.67 kilogram | 1.5 kilogram |
| Thickness | 60 mm | 20 mm |
| Compressive Strength | 30 MPa | 30 MPa |
| Heat resistance | — | Up to 150° C. |
| Water absorption | <6% | 1.033% |
| Stability | — | Deformation starts after 150° C. |
| Compressive load | 30 N/mm$^2$ | 30 N/mm$^2$ |
| Melting temperature | — | Melting starts at 180° C. |
| Curing time | 3 to 15 days | — |
| Setting time | 10 hours | 1.5 hours |
| Bonding material | Cement | Waste plastic |
| Burning rate | — | Zero |
| Flammability | — | No flames |

From the above table, it is conclude that half weight and dimension of the present invention (P) provides equal compressive strength and the manufacturing time, and also reduces manufacturing time by 10 times which thereby decreases the manufacturing cost. Thus the present invention (P) provides the composite with substantially increased shelf life, strength, substantially high strength to weight ratio and durability and therefore is highly efficient and environment friendly.

Advantages of Present Invention

The present invention eliminates the use of harmful cement in manufacturing composites yet provides composites with increased strength and stability.

It utilizes the non-segregated plastic waste thereby eliminates the process of treating and segregating plastic waste that involves use of huge machinery that requires more energy input and man power. Therefore it is energy efficient, cost efficient, user friendly and environment friendly.

The manufacturing time required by the present process is substantially decreased.

Provides composites that are light in weight yet are highly stable. This further facilitates the transportation of the composites reducing the man power in handling said composites.

It substantially decreases the use of sand/minerals and therefore is environment friendly.

It provide the novel composition for manufacturing plastic composites and its process which provide the resistance to flammability and burning of the composites.

It uses industrial waste as a filler material therefore reduces their dumping into landfills and provides their afterlife use also.

It provides a novel composition for manufacturing plastic composite and process wherein the process use less water absorption rate.

It provides a novel composition for manufacturing plastic composite and process that is resistance to physical and chemical forces, corrosion resistance, chemical resistance and shock resistance.

Eliminates the generation of effluent during the process of manufacturing composites.

Eliminates the generation of hazardous gases during the process of manufacturing composites.

Unlike the conventional techniques the present invention does not require water for manufacturing the composites and thus saves water and is therefore efficient and environment friendly.

The invention claimed is:

1. A fire resistant composition for manufacturing plastic composites,
wherein said composition exhibits compressive strength in arrange of 50 N/mm$^2$-75N/mm$^2$ and
wherein said composition is comprised of a mixture of non-segregated plastic and industrial waste, which comprises:
composite A,
composite B, and
composite C,
in a weight ratio of 40-65%:57-30%:3.5-5% respectively;
wherein said composite A consists of (a) sand or silica and (b) aggregates or quarry dust
wherein said composite B consists of non-segregated plastic wastes and copolymer; and
wherein said composite C consists of fly ash, ceramic waste and additives, said additives being selected from one or more of the group consisting of aluminum hydroxide, polyester, PVC, huntite, magnesium hydroxide, and ethyl-vinyl acetate.

2. The fire resistant composition of claim 1, wherein said plastic and industrial waste is selected from the group consisting of polyethyleneterephthalate, high density polyethylene, low density polyethylene, polypropelyne, polystyrene, and polyvinylchloride, and wherein the copolymer is selected from the group consisting of ethylene and propylene copolymers.

3. The fire resistant composition of claim 1, wherein the plastic and industrial waste and copolymer consist of one or more selected from the group consisting of: plastic water bottles, plastic bags, plastic jars, plastic drums, poly sack, plastic toys, polyvinylchloride cooling sheets, hotmelt bags, plastic bottles, plastic films, plastic cups, multi-layer laminated plastic, aluminum-containing plastic, and soft plastics.

4. The fire resistant composition of claim 1, produced by a process which comprises: collecting Composite A, Composite B, and Composite C, from construction or demolition waste, cleaning and de-moisturizing Composite A, shredding, washing, and drying Composite B, mixing Composite A, Composite B, and Composite C into a waste stream, heating the waste stream, die cast molding the waste stream, applying a hydraulic pressure to a mold, and curing the mold at ambient temperature for less than one hour, thereby producing the fire resistant composition.

5. The process of claim 4, wherein cleaning is achieved by passing Composite A through a wire mesh to obtain particles of a size ranging from 1 to 25 mm, wherein shredding comprises placing Composite B into a shredder machine to obtain a mixture of plastic flakes and copolymer, and wherein heating is conducted at a temperature range of 160° C. to 300° C. at a continuous rate of 10 to 30 RPM to provide a homogenized mixture.

6. The process of claim 4, wherein no cement is employed in any step of the process, and wherein no water is employed in any step of the process.

* * * * *